United States Patent [19]

La Russa

[11] 4,246,605
[45] Jan. 20, 1981

[54] OPTICAL SIMULATION APPARATUS

[75] Inventor: Joseph A. La Russa, Yorktown Heights, N.Y.

[73] Assignee: Farrand Optical Co., Inc., Valhalla, N.Y.

[21] Appl. No.: 84,290

[22] Filed: Oct. 12, 1979

[51] Int. Cl.³ ............................................... H04N 7/18
[52] U.S. Cl. ..................................... 358/104; 353/30; 355/20; 358/183; 434/20; 434/43; 434/69
[58] Field of Search ............... 358/104, 183; 35/12 N; 355/20; 353/30

[56] References Cited

U.S. PATENT DOCUMENTS

| 3,746,782 | 7/1973 | Driskell | 358/183 |
| 3,796,487 | 3/1974 | Voorhees | 355/20 |
| 4,107,854 | 8/1978 | Bougon | 358/104 |

Primary Examiner—Howard W. Britton
Attorney, Agent, or Firm—John L. Downing

[57] ABSTRACT

Optical simulation apparatus using a video target image superimposed upon an appropriately blanked-out film transparency of background is used to train an observer in target tracking. The apparatus also includes means to occult all or a portion of the target image presented to the trainee by an appropriate foreground image.

6 Claims, 6 Drawing Figures

OPTICAL SIMULATION APPARATUS

FIELD OF THE INVENTION

This invention relates to optical simulation apparatus, and more particularly to an improvement in optical tracking apparatus.

BACKGROUND OF THE INVENTION

In the training of military, commercial and other personnel, it is often desirable to make use of a target tracking simulator in which the trainee must attempt to keep a given target within the sights of the tracking apparatus. In other applications the trainee must detect and recognize realistic targets against a realistic background of excellent real world-like fidelity provided by a medium such as a color transparency. In such a target tracking simulator or target recognition trainer, a movable background is provided and a movable target can be introduced into the scene by the operator of the simulation apparatus, whether the simulator be under human or automatic control. In the past, television screens have been used to provide the background image, and the target has been introduced electronically into the scene by "blanking out" a portion of the video background scene and inserting an image of the target upon the video background at a desired position, attitude and apparent distance. One such technique is described in U.S. Pat. No. 3,746,782 issued to Carl R. Driskell.

Because of the nature of television image generation, the resolution of video background images is not of the highest quality. The present invention makes use of a high resolution film strip to generate the background image, uses video techniques to generate the target image, and then inserts the optical target image into the background at the desired position and aspect by a novel technique. Specifically, a cathode ray tube is used to illuminate the background film image, and a video camera is used to observe the target and generate an electronic video signal which "blanks out" the CRT background illumination at the desired target position for the exact size of the target image. The target image is then optically inserted at this "blanked out" space for observation by the simulator trainee. In this manner, the high resolution of film background and foreground terrain are retained in the target tracking simulator.

In a further improvement of the present invention, the target image, or portions thereof, can be blanked out or occulted by a display of "foreground" images, and in this manner the target appears to the trainee observer to weave in and out of the background and foreground in a most realistic manner.

SUMMARY OF THE INVENTION

The present invention provides optical simulation apparatus using a target image superimposed upon a terrain film transparency illuminated by a cathode ray tube raster blanked out in an area corresponding to the target image. The superimposed image is presented to an observer for target tracking. Additionally, the present invention provides means to occult all or a portion of the target image by a foreground image.

Specifically, the present invention comprises a first cathode ray tube which generates an illuminating first raster, and a terrain image film transparency positioned in front of and illuminated by that first raster. Means for generating an image of a target are provided, as is a first video camera for viewing that target image. Electronic apparatus is connected to the first video camera and to the first cathode ray tube for blanking out a portion of the first raster identical to the image outlined by the target viewed by the first video camera. Optical means for combining and superimposing the image of the target upon the blanked-out portion of the first raster makes it possible to present a composite view of the target superimposed and inserted into the terrain image for presentation to an observer.

The preferred embodiment of the present invention also advantageously comprises a second cathode ray tube for generating a second illuminating raster, and a foreground image occulting film transparency positioned in front of and illuminated by that second raster. In this improvement there are additional optical means for presenting the foreground occulted image for viewing by a second video camera. There are also additional electronic means connected to the means for generating the target image connected to the second video camera for blanking out at least a portion of the target identical to a superimposed foreground occulting image viewed by the second video camera.

DESCRIPTION OF THE SPECIFIC EMBODIMENT

Figure 1:
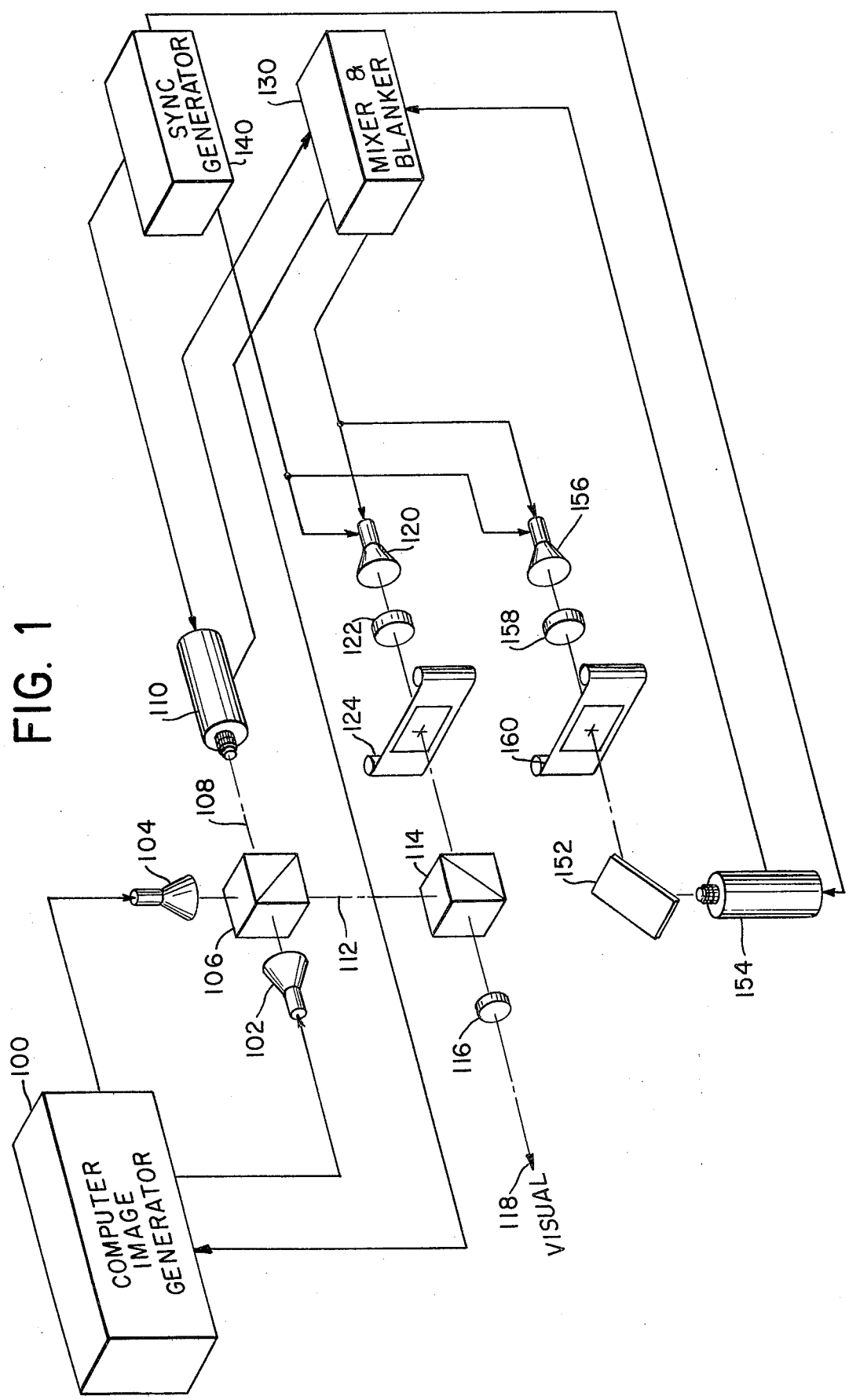
FIG. 1 is a block diagram of a specific embodiment of the present invention.
Figure 2:
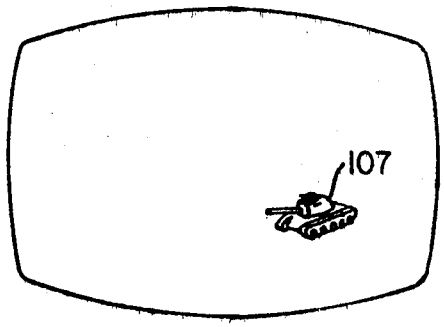
FIG. 2 is a representation of a typical target image generated by the apparatus if FIG. 1.

FIG. 1 shows a block diagram of an embodiment of the present invention. A programmable digital computer video image generator 100, such as is well known to those skilled in the digital and video arts, is provided to generate two video signals. One of these signals is transmitted to a cathode ray tube 102 to produce an image of a target such as the military tank shown in FIG. 2. The generator 100 can be programmed so that the target image on the tube 102 changes attitude and apparent size as desired by the operator of the system. A second video signal is transmitted from the generator 100 to another cathode ray tube 104 for the programmable display of other effects, such as an artillery blast from the tank's gun, or an explosion caused by a gunnery hit upon the target. These images are combined by a beam splitter 106 which transmits the combined target and blast effects images 107 (FIG. 2) along path 108 to a first video camera 110. In this mode of operation the combined target images 107 can also be generated in a purely optical manner i.e., by means of a scanning probe viewing a movable physical target.

The same combined target images 107 are also directed through the beam splitter 106 along path 112 to another beam splitter 114 which reflects the target images (hereinafter called the target image 107) through a lens 116 for viewing by an observer trainee 118. The observer 118 also sees through the beam splitter 114 an image of terrain which is produced by having a first cathode ray tube 120 generate an illuminating raster and having that illumination projected by means of a lens 122 through a movable film transparency 124 of the terrain through which the target is to be moving. The film transparency 124 can be advanced or moved backward by means not shown to simulate observer vehicle motion with respect to the background.

Figure 3:
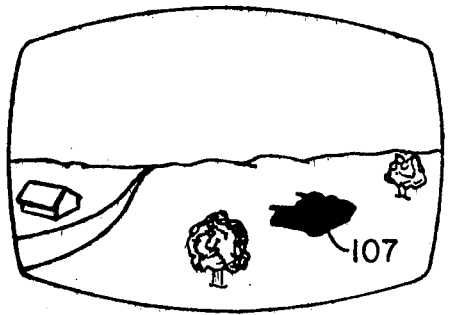
FIG. 3 is a representation of a typical background image generated by the apparatus of FIG. 1 as occulted by the target image of FIG. 2.

Not all of the terrain image is directed toward the observer 118, however, since the first video camera 110 whose output represents the target image 107 is connected to a video mixer and blanker 130. The construction of this electronic apparatus is also well known to those skilled in the video arts. As a result of the signal from the video camera 110 the mixer and blanker apparatus 130, which is connected to the input of the cathode ray tube 120, blanks out a portion of the illuminating raster of that tube corresponding in size and position to the outline of the target image. The result is that the terrain image projected to the observer 118 contains, as shown in FIG. 3 a blanked out portion 200, and upon this blanked out portion is superimposed from path 112 an optical image of the target. Thus the observer 118 has the advantage of viewing a movable computer generated target image against a high resolution film terrain background. A video synchronization signal generator 140 is connected to the video camera 100 and the cathode ray tube 120 to keep the images in synchronization.

Figure 4:
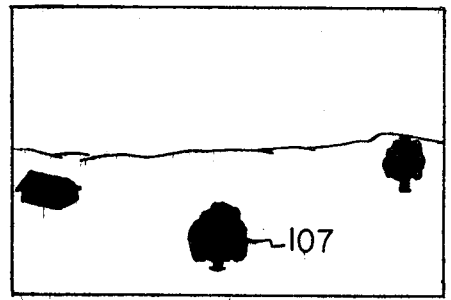
FIG. 4 is a representation of a typical foreground occulting film used in the apparatus of FIG. 1.
Figure 5:
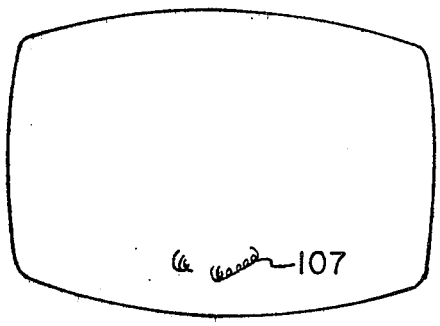
FIG. 5 is a representation of a target image occulted by a portion of the foreground occulting image.
Figure 6:
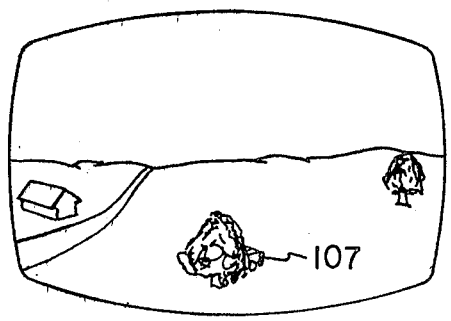
FIG. 6 is a representation of the composite scene of a target image, background and foreground images presented to a trainee observer by the apparatus of FIG. 1.

A preferred embodiment of the present invention also has the following features. In this arrangement a second cathode ray tube 156 is provided to generate an illuminating raster which is projected through a lens 158 to a movable (by means not shown) film transparency 160 of foreground images which are desired to occult the target image as it moves across the terrain. The foreground-occulting transparency 160 is made by reproducing a specific "foreground" portion of the terrain transparency 124. A representation of such a foreground occulting film transparency 160 is shown in FIG. 4. This foreground occulting image is transmitted by means of a mirror 152 to the second video camera 154. The video camera 154 is connected to the mixer and blanking apparatus 130, and whenever the video camera 154 scanning line detects an edge crossing of the terrain occulting image 160 it appropriately turns "on" or "off" the scanning beam of the video camera 110 so that the target image is not complete, but illumination of that portion of background film is as represented in the illustration of FIG. 5. With the target image so modified by the terrain occulting image the composite scene that the observer 118 views is that of a target image occulting and being occulted by portions of the terrain in a realistic manner such as is illustrated in FIG. 6. The synchronization generator 140 is also connected to the second cathode ray tube 156 and the second video camera 154 to keep all the generated images in synchronization. It will also be understood that the terrain and terrain occulting transparencies 124 and 160 are moved together in exact synchronization in the operation of the apparatus. An additional feature of this invention is that blast and smoke effects appear particularly realistic since the video camera 110 will begin to "see through" the blast effects generated by the image generator 100 as the smoke disperses and the intensity of the scanning beam of CRT 120 varies from full "off" to full "on" in a gradual manner.

What is claimed is:

1. Optical apparatus comprising:
   (a) a first cathode ray tube means for generating an illuminating first raster;
   (b) a terrain image containing film positioned in front of and illuminated by said first raster;
   (c) means for generating an image of a target;
   (d) a first video camera for viewing said image of a target;
   (e) electronic means connected to said first video camera and to said first cathode ray tube for blanking out a portion of said first illuminating raster identical to the image outline of the target viewed by said first video camera;
   (f) optical means for combining and superimposing said image of said target upon said blanked out portion of said first raster, to present a composite view of said target superimposed upon said terrain image to an observer.

2. Optical apparatus according to claim 1 further comprising:
   (a) a second cathode ray tube means for generating a second illuminating raster;
   (b) a foreground image-occulting film positioned in front of and illuminated by said second raster;
   (c) a second video camera for viewing said foreground-occulting image;
   (d) additional electronic means connected to said second video camera and said first cathode ray tube for blanking out at least a portion of said target image identical in outline to a superimposed foreground-occulting image viewed by said second video camera.

3. Optical apparatus according to claim 1 further comprising means for varying the relative positioning of said target image and said terrain image.

4. Optical apparatus according to claim 1 further comprising means for changing the portion of said terrain film illuminated by said first raster.

5. Optical apparatus according to claim 2 further comprising means for changing the portion of said foreground occulting film illuminated by said second raster.

6. Optical apparatus according to claim 1 whereby said means for generating an optical image of said target is adapted to vary the attitude and apparent distance of said target image.

* * * * *